United States Patent
Shimada

[11] Patent Number: 5,687,296
[45] Date of Patent: Nov. 11, 1997

[54] IMAGE DATA PROCESSOR HAVING DATA BUS SWITCHING CIRCUIT FOR CHANGING IMAGE RESOLUTION

[75] Inventor: Yasuo Shimada, Nagoya, Japan

[73] Assignee: Brother Kogyo Kabushiki Kaisha, Nagoya, Japan

[21] Appl. No.: 442,650

[22] Filed: May 16, 1995

[30] Foreign Application Priority Data

May 19, 1994 [JP] Japan .................................. 6-131148

[51] Int. Cl.⁶ .............................. G06F 15/00; H04N 1/40
[52] U.S. Cl. ...................... 395/102; 395/102; 395/106; 395/112; 358/444; 358/445; 358/447
[58] Field of Search ............................ 395/102, 106, 395/112, 117, 109; 358/444, 445, 447, 451

[56] References Cited

U.S. PATENT DOCUMENTS

| | | | |
|---|---|---|---|
| 4,122,520 | 10/1978 | Adamchick et al. | 364/200 |
| 5,206,741 | 4/1993 | Shimura et al. | 358/404 |
| 5,299,028 | 3/1994 | Kwarta | 358/445 |
| 5,480,236 | 1/1996 | Kawaoka | 400/120.01 |
| 5,528,345 | 6/1996 | Hasegawa | 355/200 |
| 5,530,901 | 6/1996 | Nitta | 395/848 |

FOREIGN PATENT DOCUMENTS

A-57-34286  2/1982  Japan.

Primary Examiner—Edward L. Coles, Sr.
Assistant Examiner—Mark Wallerson
Attorney, Agent, or Firm—Oliff & Berridge

[57] ABSTRACT

An apparatus for processing original image data to produce print image data used by a printer, wherein a data bus switching circuit provided between an original image data memory and a shift register is selectively placed in a 1X mode or an NX mode. In the 1X mode, each bit of the original image data is transferred as a bit of the print image data to the shift register without conversion. In the NX mode, each bit of the original image data is converted into N ($\geq 2$) number of bits of the print image data which have the same logical value equal to that of the original image data bit. The addresses of the shift register at which the print image data are sequentially stored are designated by an address counter based on a mode select signal and a write command for reading a set of the original image data for one line from the original image data memory. A read signal is generated for reading out a next set of the original image data, on the basis of the mode select signal and a signal received from the printer when each line of image has been printed.

21 Claims, 8 Drawing Sheets

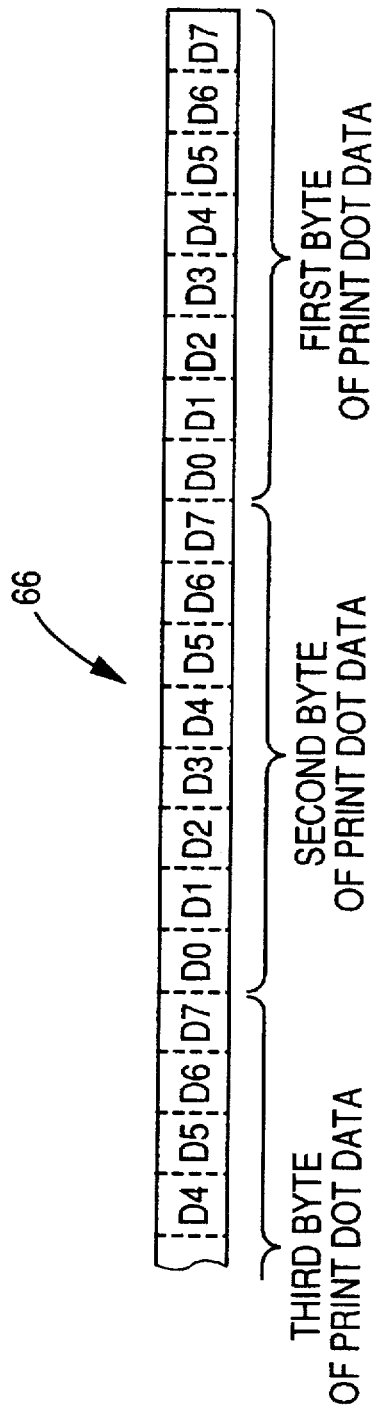
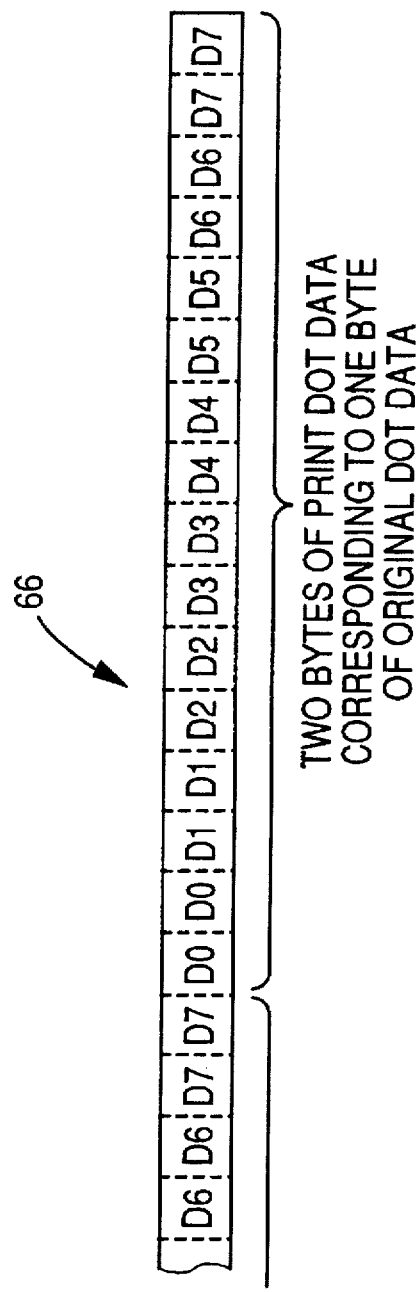

1

IMAGE DATA PROCESSOR HAVING DATA BUS SWITCHING CIRCUIT FOR CHANGING IMAGE RESOLUTION

BACKGROUND OF THE INVENTION

1. Field of the Invention

The present invention relates in general to an apparatus for processing image data used by a printer for printing an image, and more particularly to an image data converter adapted to convert original image data representative of an original image having a relatively low resolution into print image data representative of an image having a relatively high resolution which is the image resolution of a printing or recording device that uses the print image data for effecting a printing operation.

2. Discussion of the Related Art

There is known a printing or recording device such as a laser printer adapted to print an image on a recording medium, using original image data which are obtained by an image reader or an image data generator. In some cases, the resolution of an image reproduced by the printing apparatus is different from that of an original image represented by the original image data. Where the original image data are dot data representative of an original image to be reproduced by a laser printer in a matrix of dots, the resolution of the original image is 300 dpi (dots per inch), while the image resolution of the printing apparatus is 600 dpi, for example. In such cases, the original dot data having a standard image resolution of 300 dpi should be converted into print dot data having a fine image resolution of 600 dpi. Described in detail, a set of original dot data of 300 dpi representative of each line of image parallel to the primary scanning direction of the laser printer is read out from an original image data memory and converted into two sets of print dot data of 600 dpi representative of two identical lines of image, which are arranged in the secondary scanning direction of the printer. Each set of original dot data consists of 300 bits while each set of print dot data consists of 600 bits. Each bit of the original dot data corresponds to two adjacent bits of the print dot data both of which have the same logical value (which is the same as the logical values of the bit of the original dot data). The thus obtained print dot data are once stored in a print image data memory, and individual sets of the print dot data representative of different lines are written into a shift register in the form of a first-in first-out memory (FIFO memory) one after another, one line at a time. Individual bits of each set of the print dot data are serially transferred as video signals from the FIFO memory to a laser scanning device of a printing mechanism of the laser printer, in synchronization with a video clock signal having a frequency corresponding to the fine image resolution.

Some laser printers are capable of operating in a selected one of two modes, that is, either a 1X mode or a 2X mode. In the 1X mode, each set of original dot data having the fine image resolution of 600 dpi is converted into a set of print dot data having the fine image resolution of 600 dpi. In the 2X mode, each set of original dot data having the standard image resolution of 300 dpi is converted into two sets of print dot data having the fine image resolution of 600 dpi, which represent two identical lines of image and each of which consists of 600 bits. Therefore, the laser printers require two clock signal generating circuits which are selectively activated by a switching circuit to selectively generate two kinds of video clock signals, one having a first frequency corresponding to the standard image resolution of 300 dpi, and another having a second frequency corresponding to the fine image resolution of 600 dpi. The second frequency is about one fourth of the first frequency. According to this arrangement, the time required for printing one page of image in the 1X mode is the same as that in the 2X mode.

An example of another type of image data converter for a printer operable in a selected one of the 1X and 2X modes is disclosed in JP-A-Z57-34286, wherein first and second clock signal generating circuits 6, 7 adapted to generate clock signals having respective frequencies f and 2f are selectively activated by a switching circuit 8 on the basis of a frequency selecting bit which is received from an image data memory 1 together with image data such as character cedes. When the frequency selecting bit is "0", the first clock signal generating circuit 6 is activated so that the bits of the print dot data of the standard image resolution are transferred from a data converting circuit 9 to a printing device 11 in synchronization with the clock signal having the frequency f. When the frequency selecting bit is "1", the second clock signal generating circuit 7 is activated so that the bits of the print dot data of the fine image resolution are transferred from the data converting circuit 9 to the printing device 11 in synchronization with the clock signal having the frequency 2f. According to this arrangement, the time required for printing one line of image in the 1X mode is the same as that in the 2X mode.

In a laser printer adapted to convert the original image data of the standard image resolution (e.g., 300 dpi) into the print image data according to the fine image resolution (e.g., 600 dpi) of the printer as described above, a print image data memory having a large capacity is required for storing the print dot data before the print image data are transferred to a shift register (FIFO memory). Further, this type of laser printer requires a time for converting the original image data into the print image data, and also a time for transferring the print image data to the shift register. Accordingly, the printing efficiency is reduced.

In the printer as disclosed in JP-A-57-34286 which is operable selectively in the 1X and 2X modes, a clock signal generator incorporates the two clock signal generating circuits and is therefore complicated. Further, the switching circuit is required for selectively activating the two clock signal generating circuits, and the control system for controlling the image data converter and the printing mechanism tends to be complicated and large-sized. Moreover, the control system requires a lot of time for transferring the print dot data of the fine image resolution to the FIFO memory in the 2X mode.

SUMMARY OF THE INVENTION

It is therefore a first object of the present invention to provide an image data processing apparatus which is capable of efficiently transferring print image data of relatively high image resolution directly to a shift register while the print image data are obtained by conversion from original image data of relatively low image resolution.

It is a second object of this invention to provide a printer incorporating such an image data processing apparatus.

The above first object may be achieved according to a first aspect of the present invention, which provides an image data processing apparatus having an original image data memory for storing a batch of original image data, and a shift register for storing print image data obtained by conversion from the original image data which are received from the original image data memory at least one byte at a time, the print image data being serially fed from the shift register to printing means for printing according to the print image data, the apparatus comprising: (a) a data bus switching circuit selectively operable in a 1X mode and an NX mode for selectively placing a data bus connecting the original image data memory and the shift register, in a 1X state and an NX state, respectively, wherein the data bus placed in the 1X state transfers as a bit of the print image data each bit of the original image data to the shift register without conversion thereof, and the data bus placed in the NX state converts each bit of the original image data into a plurality of bits of the print image data which have the same logical value equal to a logical value of the corresponding bit of the original image data and which are stored in the shift register, the number of the above-indicated plurality of bits of the print image data being equal to "N" which is a natural positive number not smaller than "2"; (b) mode selector means for placing the data bus switching circuit in one of the 1X and NX mode, in response to a mode select signal which is received from an external device and which selects one of the 1X and NX modes; (c) address counting means for designating addresses of the shift register at which the print image data are sequentially stored, in response to the mode select signal and each write command for reading out from the original image data memory the original image data at least one byte at one time and storing the corresponding print image data in the shift register through the data bus, when a set of the original image data representative of one line of image is converted into the corresponding set of print image data; and (d) read signal generating means for generating a read signal for reading out from the original image data memory said set of the original image data, on the basis of the mode select signal and a one-line signal received from the printing means in relation to printing of each one line of image has been printed.

In the image data converting apparatus of the present invention constructed as described above, the data bus connecting the image data memory and the shift register is placed in the 1X state and the NX state when the data bus switching circuit is placed in the respective 1X and NX modes. In the 1X state, the data bus simply transfers each bit of the original image data to the shift register as the corresponding bit of the print image data. In the NX state, the data bus converts each bit of the original image data into two or more bits of the print image data which have the same logical value equal to that of the corresponding bit of the original image data. The number of the two or more bits of the print image data is equal to "N" (≦2). These bits of the print image data are stored in the shift register. The data bus switching circuit is selectively placed in the 1X or NX mode by the mode selector means, depending upon the mode select signal received from an external device, for example, an external device from which the original image data or source image data for the original image data are received. When a set of the original image data representative of one line of image is converted into the corresponding set of print image data, the address counting means designates the addresses of the shift register at which the print image data are sequentially stored. This designation of the addresses is effected in response to the mode select signal and each write command which is generated for reading out from the original image data memory at least one byte at one time and storing the corresponding print image data in the shift register through the data bus. The read signal generating means is adapted to generate the read signal for reading out from the original image data memory the set of the original image data representative of one line of image, on the basis of the mode select signal and a one-line signal which is received from the printing means in relation to printing of each one line of image, for example, received just prior to the printing of each line of image.

In the apparatus form of the present invention, when the data bus switching circuit is placed in the 1X mode, therefore, a set of the original image data representative of one line of image is read out from the original image data memory, at least one byte at one time, and is simply transferred to the shift register as the corresponding set of the print image data through the data bus placed in the 1X state, each time the one-line signal is received from the printing means. When the data bus switching circuit is placed in the NX mode, on the other hand, a set of the original image data representative of one lane of image is read out from the original image data memory and converted into the corresponding set of print image data, each time the one-line signal has been received N times. Namely, the same set of print image data is used for printing a plurality of successive lines, the number of which is equal to "N". In the NX mode, each bit of the original image data is transferred to the shift register as N number of bits of the print image data whose logical values are all equal to that of the corresponding bit of the original image data.

In the present image data processing apparatus described above, the conversion of the original image data into the print image data in the NX mode through the data bus switching circuit placed in the NX state is effected as the original image data are read out from the original image data memory. Therefore, no extra time is required generate the print image data in the NX mode before the print image data are transferred from the shift register to the printing means as in the prior art apparatus. Further, the present apparatus does not require a large-capacity memory such as a page memory for storing a batch of print image data for one page of image. In the present apparatus, the same set of print image data corresponding to one set of the original image data for one line of image is used for printing two or more successive identical lines of image in the NX mode, upon generation of the one-line signal N number of times. This is contrary to the prior arrangement which requires two or more identical sets of print image data to be prepared, so that these sets of print image data are transferred one after another, in synchronization with the one-line signal (e.g., horizontal synchronizing signal generated by the printing means). Accordingly, the present arrangement is effective to reduce the time required for generating the print image data and transferring the same as the video signals to the printing means, whereby the printing efficiency is significantly improved.

In one preferred form of the invention, the address counting means is adapted to increment a count of the number of the addresses of the shift register each time N bytes of the original image data have been transferred to the shift register when the data bus switching circuit is placed in the 1X mode, and increments the count each time one byte of the original image data has been converted into the print image data when the data bus switching circuit is placed in the NX mode. This arrangement permits the individual bytes of the print image data to be stored at the successive addresses of the shift register, which are suitably designated depending upon the currently selected mode of the data bus switching circuit, as the original image data are read out form the original image data memory.

In a further preferred form of the invention, the one-line signal is a horizontal synchronizing signal which is generated before the next set of the original image data is read out from the original image data memory. The horizontal synchronizing signal activates the printing means to start a printing operation on a recording medium according to the print image data set corresponding to the above-indicated next set of the original image data. In this case, the shift register may be adapted to transfer bits of the print image data serially one after another to the printing means in response to video clock signals. The read signal generating means may comprise a video clock counter for counting the number of the video clock signals and generate a count-up signal when a count of the video clock counter becomes equal to a first value equal to the number of bits of the print image data representative of one line of image while the data bus switching circuit is placed in the 1X mode selected by the mode select signal, and when the count of the video clock counter becomes equal to a second value equal to the number of bits of the print image data representative of N lines of image while the data bus switching circuit is placed in the NX mode selected by the mode select signal. In this instance, the read signal generating means generates the read signal when the horizontal synchronizing signal is received after the count-up signal is generated.

In a further preferred embodiment of the invention, the apparatus further comprises a direct memory access controller for reading at least one byte of the original image data from the original image data memory in response to the read signal generated by the read signal generating means. In this case, the address counting means may comprise a write command counter for counting the number of the write commands received from the direct memory access controller. The write command counter generates a write address signal and write information on the basis of a count of the number of the write commands and the mode select signal. The write information designated an area of the shift register at the address designated by the write address signal, for storing in the designated area the print image data corresponding to the at least one byte of the original image data read out from the original image data memory. The apparatus may further comprise a processing unit for controlling the direct memory access controller. In this case, the direct memory access controller is adapted to apply an interruption signal to the processing unit when the read signal generated by the read signal generating means is applied to the direct memory access controller. The processing unit supplies the direct memory access controller with control information for starting an operation to read out a next set of the original image data from the original image data memory, upon reception of the interruption signal. The control information includes data indicative of a location from which the next set of the original image data is read out from the original image data memory.

According to a yet further preferred form of the present invention, one byte of the original image data which is read out from the original image data memory at one time, and the number "N" is equal to "2", namely, the NX mode is a 2X mode in which each bit of the one byte of the original image data is converted into two bits of the print image data which have the same logical value.

The first object may also be achieved according to another aspect of this invention, which provides an image data processing apparatus for converting original image data, at least one byte at a time, into print image data which are serially fed to printing means, the apparatus comprising: (i) a first data bus having a plurality of first signal lines for transferring at one time bits of at least one byte of the original image, the number of the plurality of signal lines being equal to "M" which is a natural number; (ii) a second data bus having a plurality of second signal lines for transferring at one time bits of the print image data obtained from at least one byte of the original image data, the number of the bits of the print image data which are transferred at one time being equal to (N×M), where "N" is a natural number not smaller than "2", the number of the plurality of second signal lines being equal to (M×N); (iii) a data bus switching circuit provided between the first and second data buses, and selectively operable in a 1X mode and an NX mode in response to a mode select signal received from an external device, the data bus switching circuit placed in the 1X mode transferring, as bits of 1X print image data, bits of the original image data from the first signal lines to selected ones of the second signal lines without conversion thereof, the number of the selected ones of the second signal lines being equal to "M", the data bus switching circuit placed in the NX mode transferring the bits of the original image data from the first signal lines to the second signal lines the number of which is equal to (M×N) such that each of the bits of the original image data received through the corresponding one of the first signal lines is converted into a plurality of bits of NX print image data which have the same logical value equal to a logical value of each bit of the original image data, the number of the plurality of bits of NX print image data being equal to "N"; (iv) reading means for transferring a set of the original image data representative of one line of image, at least one byte at one time, from the original image data memory to the data bus switching circuit through the first data bus; (v) print image data memory means connected to the second data bus, for sequentially storing successive units of the 1X print image data each consisting of at least one byte received from the second signal lines the number of which is equal to "M", when the data bus switching circuit is placed in the 1X mode, and for sequentially storing successive units of the NX print image data each consisting of at least one byte multiplied by "N" received from the second signal lines the number of which is equal to (M×N), when the data bus switching circuit is placed in the NX mode; and (vi) read signal generating means for generating a read signal for reading out from the original image data the set of the original image data, on the basis of the mode select signal and a one-line signal received from the printing means in relation to printing of each one line of image has been printed.

The image data processing apparatus constructed according to the second aspect of the invention described above provides substantially the same advantage as described above with respect to the apparatus according to the first aspect of the invention.

The second object indicated above may be achieved according to a further aspect of this invention, which provides a printer including an image data processing apparatus described above, and printing means adapted operate to effect a printing operation on a recording medium according to the print image data obtained by the image data processing apparatus. The present printer is capable of operating in one of two modes with the data bus switching circuit selectively placed the 1X or NX mode as described above, and provides substantially the same advantages as explained above with respect to the image data processing apparatus.

The printing means may be laser printing means which includes a latent image forming device and a visible image forming device. The latent image forming device has a scanning device for imagewise scanning a photosensitive drum along successive lines according to respective sets of print image data in the primary scanning direction parallel to the axial direction of the drum, while the drum is rotated in the secondary scanning direction in which the successive lines are arranged. The visible image forming device is adapted to develop the latent image into a visible image on the recording medium.

BRIEF DESCRIPTION OF THE DRAWINGS

The above and optional objects, features, advantages and technical significance of the present invention will be better understood by reading the following detailed description of a presently preferred embodiment of the invention, when considered in conjunction with the accompanying drawings, in which:

FIG. 8 is a view showing an image data set stored in a first-in first-out memory of the image data converter placed in a 1X model and FIG. 9 is a view corresponding to that of FIG. 7 when the image data converter is placed in a 2X mode.

DETAILED DESCRIPTION OF THE PREFERRED EMBODIMENT

Figure 1:
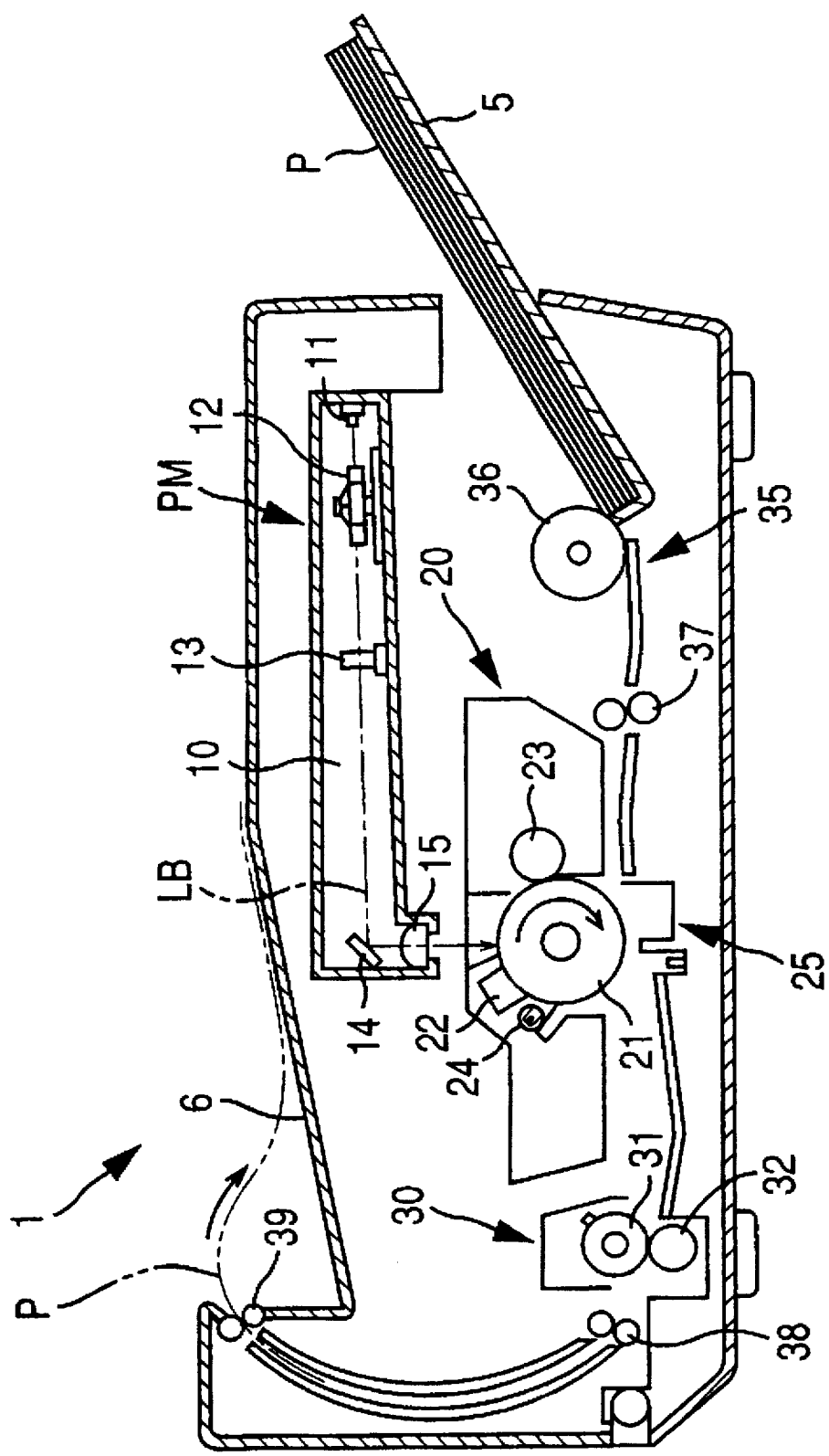
FIG. 1 is a schematic view in cross section of a laser printer to which the present invention is applied.

Referring first to FIG. 1, a laser printer 1 to which the present invention is applied is adapted to receive original image data from an external device, generate print image data in the form of dot data on the basis of the received original image data, and imagewise scan a surface of a photosensitive drum 21 in a primary scanning direction by a laser beam modulated according to the print image data, for printing on a recording medium an image represented by the print image data.

The laser printer 1 has a printing mechanism PM including: a laser scanner 10; a process cartridge 20; an image transfer device 25 having an image transfer charger and a discharger; an image fixing device 30 having an image fixing roll 31 and a pressure roll 32; and a paper feeding device 35 having a paper feed roll 36, registering rolls 37, transfer rolls 38 and ejector rolls 39.

The laser scanner 10 includes: a semiconductor laser 11 for generating a laser beam LB; a polygon mirror (hexagon mirror) 12 for deflecting the laser beam LB over a predetermined angular range; condenser lens 13 for condensing the laser beam LB; a reflector mirror 14 for reflecting the condensed laser beam 14 toward the photosensitive drum 21 of the process cartridge 20; and a lens member 15 through which the laser beam LB from the reflector mirror 14 is transmitted toward the photosensitive drum 21.

As indicated above, the process cartridge 20 incorporates the photosensitive drum 21. The cartridge 20 further includes a charger 22, a developing cylinder 23 and an exposure lamp 24, which are disposed around the photosensitive drum 21, together with the image transfer device 25 indicated above.

In operation of the laser printer 1, the polygon mirror 12 is rotated at a predetermined constant velocity so that each of the six mirror faces of the mirror 12 deflects the incident laser beam LB generated by the semiconductor laser 11. The thus deflected laser beam LB is incident upon the reflector mirror 14 through the condenser lens 13, and is reflected downward by the mirror 14 so that the reflected laser beam LB is incident upon the surface of the photosensitive drum 21 through the lens member 15. Since the laser beam LB is deflected over the predetermined angular range in the axial direction of the photosensitive drum 21, the drum 21 is scanned in the primary scanning direction parallel to its axial direction.

The angular range of deflection of the laser beam LB is determined so as to cover a predetermined printing range on the recording medium in the form of a paper sheet P. As well known in the art, the laser beam LB generated by the semiconductor laser 11 is modulated according to print image data in the form of dot data (hereinafter referred to as "print dot data") representative of an image to be reproduced, whereby the photosensitive drum 21 is imagewise scanned or irradiated along a line parallel to the axial direction. The drum 21 is rotated in timed relation with the rotation of the polygon mirror 12 such that each of the six mirror faces of the mirror 12 corresponds to a predetermined incremental angle of rotation of the drum 21, which corresponds to one scanning line. With the drum 21 imagewise scanned along successive lines by the modulated laser beams LB according to respective sets of the print dot data, an electrostatic latent image is formed on the surface of the drum 21. The present laser printer 1 is capable of printing with a FINE image resolution of 600 dpi (600 dots per inch) in the primary scanning direction (parallel to the axial direction of the drum 21), and in a secondary scanning direction which is perpendicular to the primary scanning direction and parallel to the rotating direction of the drum 21). The primary and secondary scanning directions correspond to lines and columns of a dot matrix of an image actually produced on the recording medium P. As the drum 21 is imagewise scanned along each line of the dot matrix by the modulated laser beam LB, 600 successive local spots along each line are either irradiated or non-irradiated with the modulated laser beam, so that image dots are formed on the medium P at the local spots corresponding to the irradiated local spots on the drum 21. The local spots correspond to the picture elements of the dot matrix.

An electrostatic image formed on the photosensitive drum 21 is developed into a visible image consisting of a toner transferred from the developing cylinder 23 to the laser-irradiated local spots on the drum 21. This visible image is transferred from the drum 21 onto the recording medium or paper sheet P by the image transfer device 25, as the paper sheet P delivered from a sheet stacker 5 is fed by the paper feeding device 35. The visible image is then fixed on the paper sheet P by the image fixing device 30, which is disposed downstream of the image transfer device 25. The paper sheet P which has left the image fixing device 30 is further transferred by the transfer rolls 38 and finally ejected onto a sheet tray 6 by the ejector rolls 39.

Figure 2:
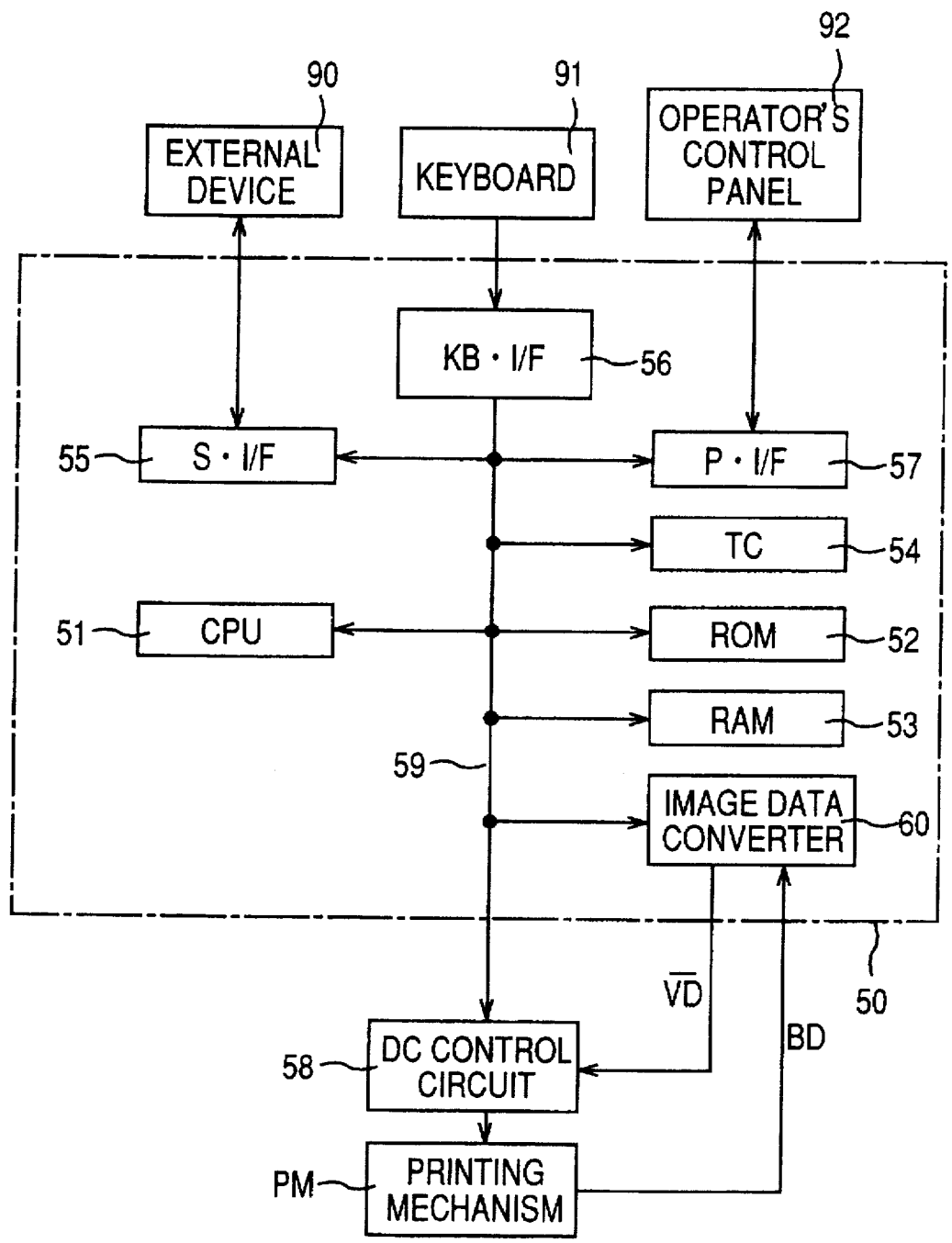
FIG. 2 is a block diagram illustrating a control system of the laser printer of FIG. 1, which incorporates an image data processing apparatus in the form of an image data converter constructed according to one embodiment of the present invention.

Referring next to the block diagram of FIG. 2, there will be described a control system for the laser printer 1, which is similar to a control system of a commonly known laser printer, except a data converter 60 constructed according to the principle of the present invention as described below in detail.

The control system has a video controller 50 which incorporates: an 8-bit CPU (central processing unit) 51; a ROM (read-only memory) 52 storing various control programs; a RAM (random-access memory) 53; a timing clock generator (TC) 54; a serial interface (S-I/F) 55; a keyboard interface (KB-I/F) 56; a panel interface (P.I/F) 57; image data converter 60 indicated above; and data bus control signal lines and other signal lines 59, which interconnect the various components indicated above.

The RAM 53 includes; a data buffer for storing image data received from an external device 90 such as a personal or host computer; a DOT DATA memory 53a for storing original dot data which are generated on the basis of the image data as received from the external device 90 and are converted into print dot data by the image data converter 60, as described below in detail; and various buffers for temporarily storing various sorts of data obtained during operation of the CPU 51. The timing clock generator 54 is adapted to generate a VIDEO CLOCK signal VDCLK of a predetermined frequency corresponding to the 600 dpi image resolution, a PRINT CLOCK signal PCLK, and various other clock pulse signals. The serial interface 55 receives the original image data from the external device 90, while the keyboard interface 56 and the panel interface 57 receive signals from a keyboard 91, and signals from an operator's control panel 92, respectively.

The control system further includes a DC control circuit 58 for controlling: a main motor for rotating the photosensitive drum 21 and operating the paper feeding device 35; a heater incorporated in the image fixing roll 31; the semiconductor laser 11; a motor for rotating the polygon mirror 12; and various other electrically operated components of the printing mechanism PM. The printing mechanism PM generates a horizontal synchronizing signal BD to be fed to the image data converter 60 each time the photosensitive drum 21 is imagewise scanned along a line the laser scanner 10. The signal BD triggers the scanning along each line according to the corresponding set of print dot data. The utility of the horizontal synchronizing signal BD in the image data converter 60 will be apparent from the following description.

Figure 7:
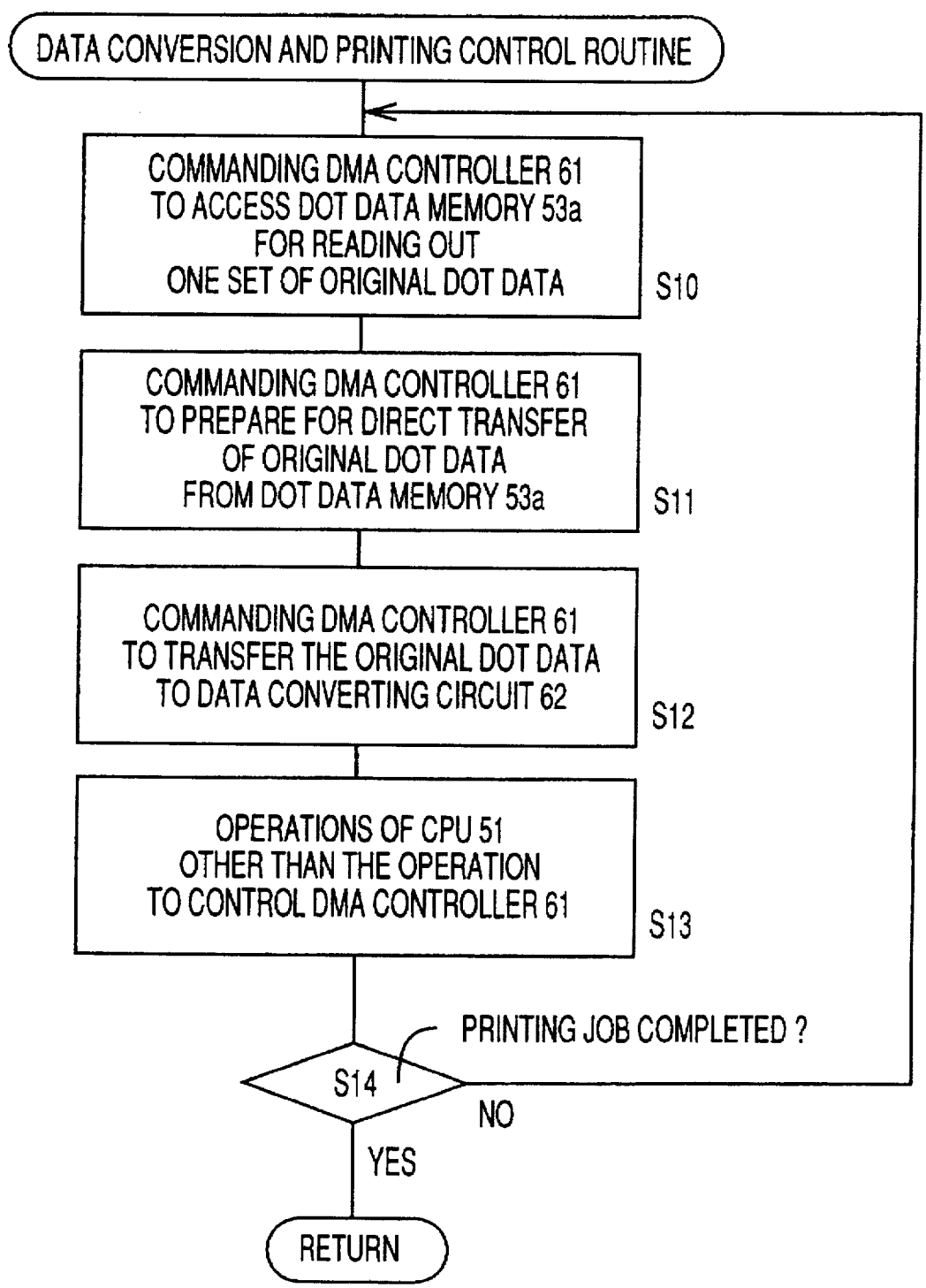
FIG. 7 is a flow chart illustrating a data conversion and printing control routine executed by the image data converter of FIG. 3.

The control programs stored in the ROM 52 include a program for executing a data conversion and printing control routine illustrated in the flow chart of FIG. 7. This routine includes process steps for controlling a direct memory access (DMA) controller 61 of the image data converter 60, for converting the original dot data stored in the DOT DATA memory 53a into the print dot data used for the printing mechanism PM.

Figure 3:
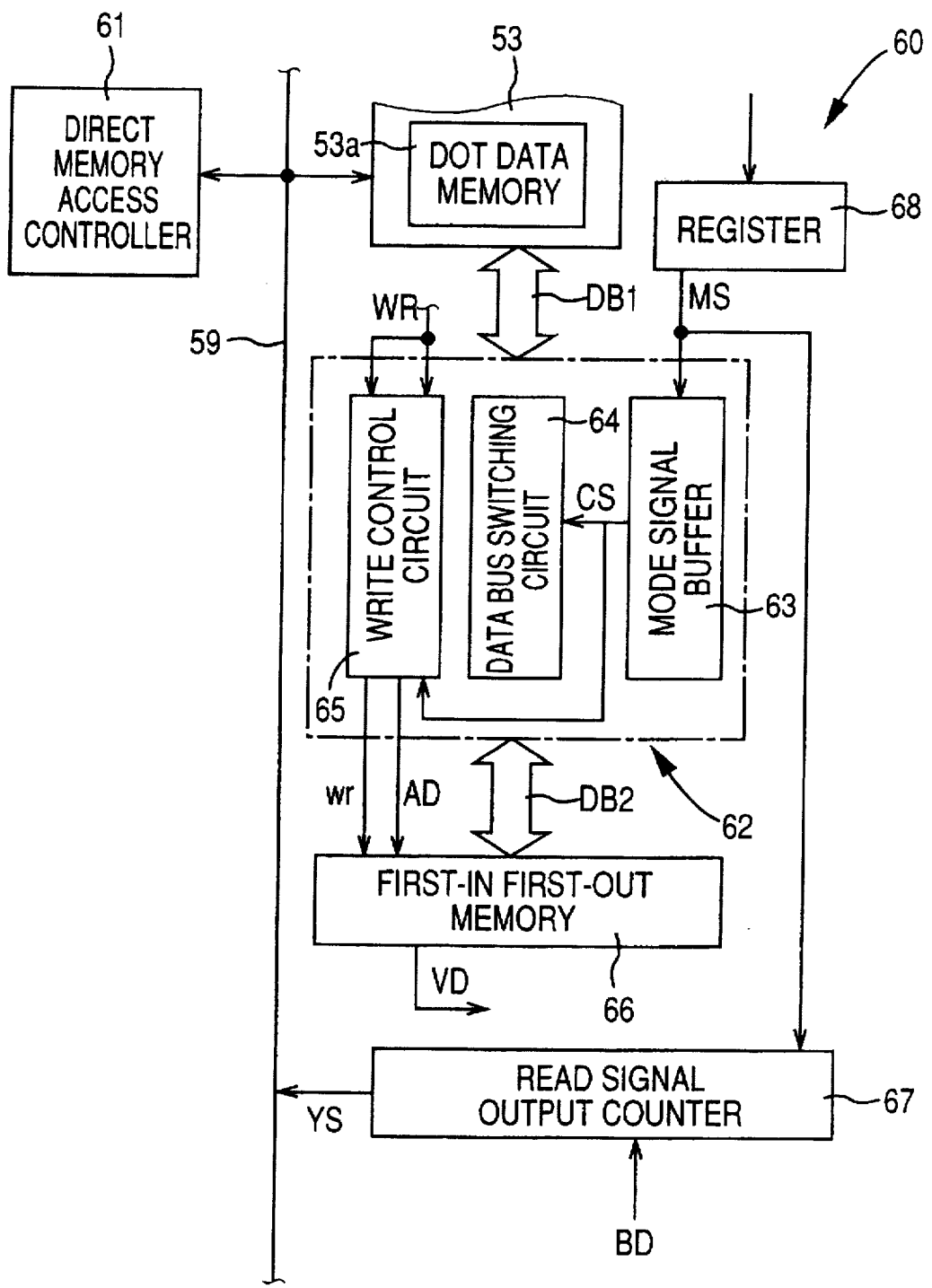
FIG. 3 is a block diagram illustrating an arrangement of the image data converter.

As indicated in FIG. 3, the image data converter 60 includes: the DMA controller 61 connected to the DOT DATA memory 53a of the RAM 53; a data converting circuit 62 connected to the DOT DATA memory 53a; a shift register in the form of a first-in first-out (FIFO) memory 66 connected to the data converting circuit 62; a READ SIGNAL OUTPUT counter 67 for generating a READ signal YS for reading the original dot data from the DOT DATA memory 53a; and a register 68. The data converting circuit 62 includes mode selector means in the form of a mode signal buffer 63, a data bus switching circuit 64, and a WRITE control circuit 65. The data converting circuit 62 is adapted to convert each one byte (eight bits) of the original dot data. transferred from the DOT DATA memory 53a into the corresponding one byte or two bytes of print dot data, depending upon a currently selected mode of the data bus switching circuit 64, namely, either a 1X mode or a 2X mode. The 1X mode is selected when the original image data (original dot data) have the FINE image resolution of 600 dpi, and the 2X mode is selected when the original image data have the STANDARD image resolution of 300 dpi. The or 2X mode is selected by a MODE SWITCHING signal CS received from the mode signal buffer 63. The FIFO memory 66 stores the print dot data thus generated by the data converting circuit 62. Each time the READ signal YS is generated by the READ SIGNAL OUTPUT counter 67, one byte of the original dot data is read out by the DMA controller from the DOT DATA memory 53a into the data converting circuit 62.

Figure 4:
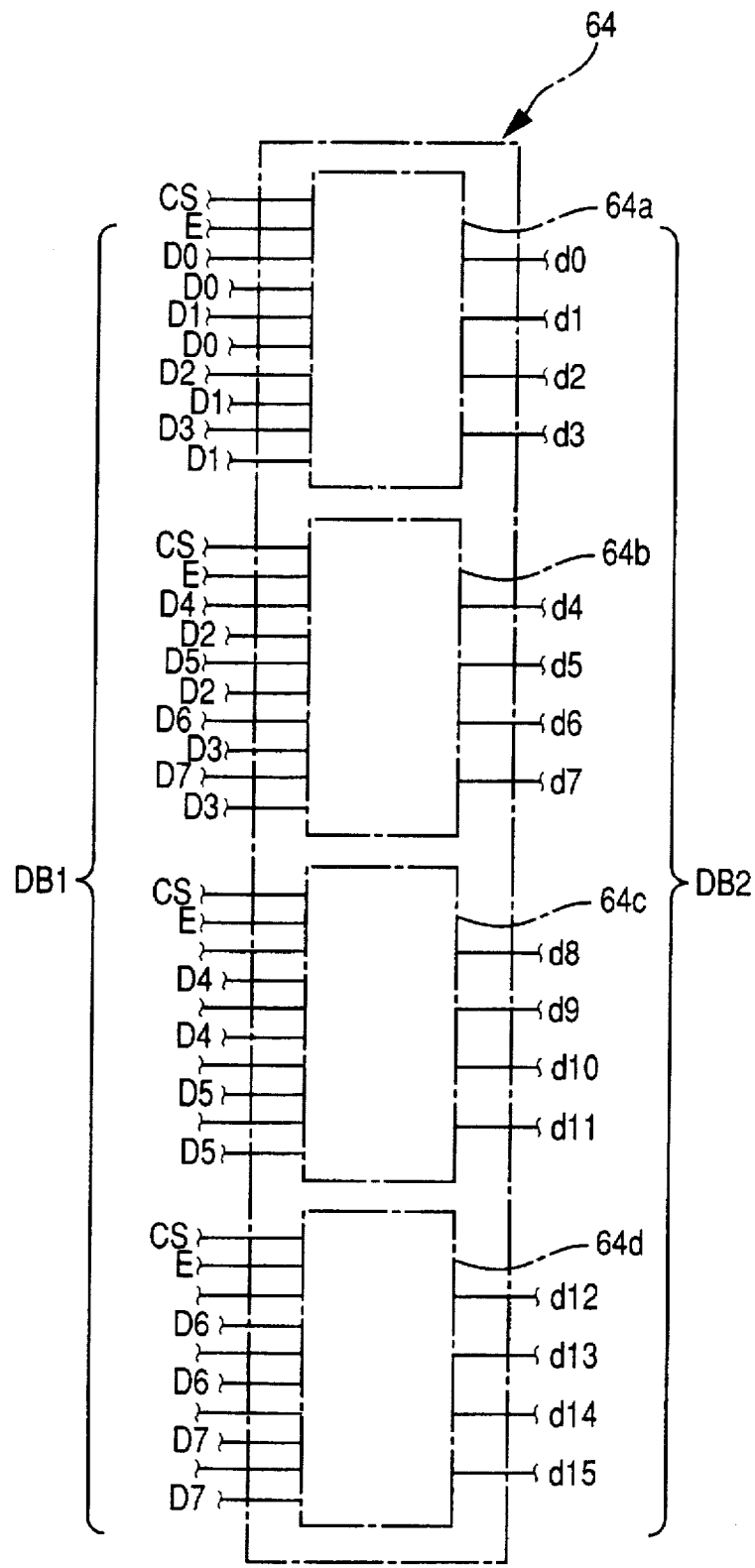
FIG. 4 is a schematic circuit diagram showing a data bus switching circuit incorporated in the image data converter.
Figure 5:
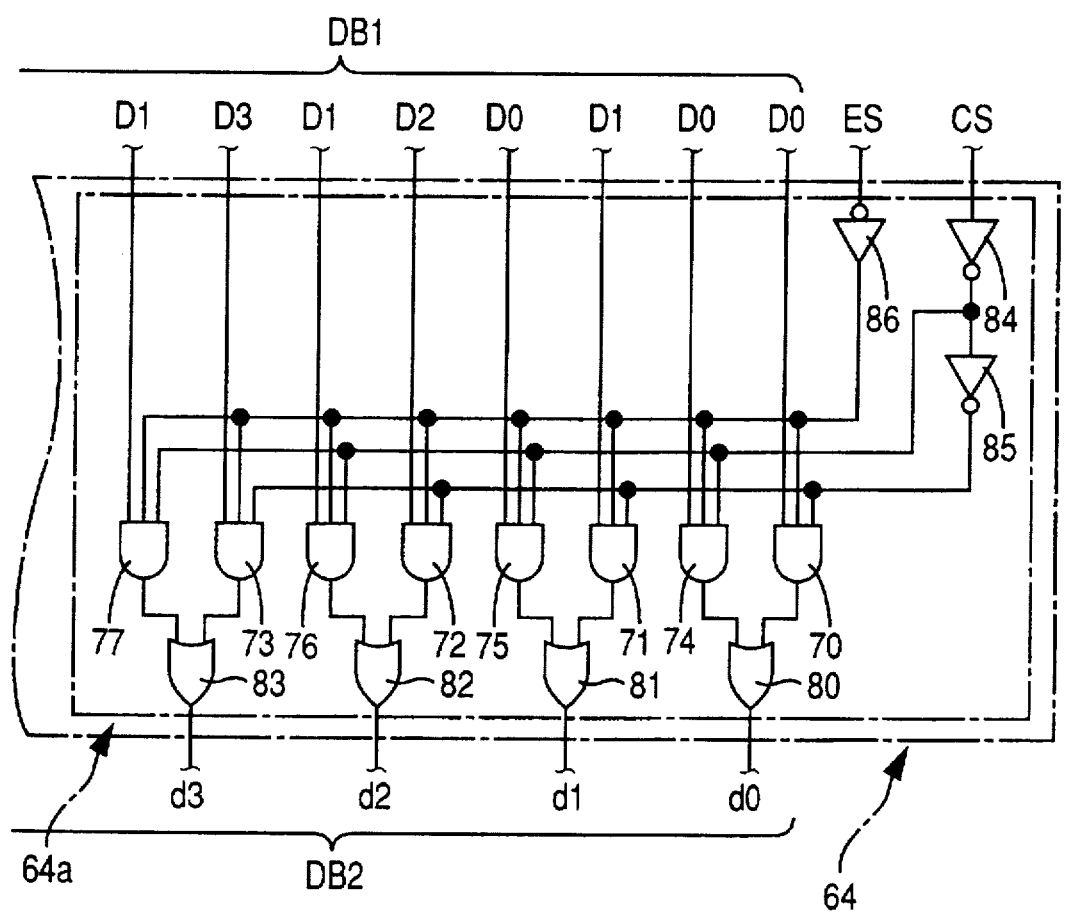
FIG. 5 is a circuit diagram showing one of data converter units in the data bus switching circuit.

The data bus switching circuit 64 of the data converting circuit 62 will be described by reference to FIGS. 4 and 5.

The data converting circuit 62 and the DOT DATA memory 53a are connected to each other through a first data bus DB1, while the data converting circuit 62 and the FIFO memory 66 are connected to each other through a second data bus DB2. The first data bus DB1 has an 8-bits arrangement whose bus lines D0–D7 are connected to four data converter units 64a–64d of the data bus switching circuit 64, as indicated in FIG. 4. The second data bus DB2 has a 16-bits arrangement whose bus lines d0–d15 are connected to the data converter units 64a–64d, as also indicated in FIG. 4.

The data converter units 64a–64d have the same arrangement, and will be described by reference to FIG. 5 which shows the first data converter unit 64a, by way of example.

The data converter unit 64a has four first AND gates 70–73, four second AND gates 74–77 and three inverters 84–86. Each of the first AND gates 70–73 has a first input terminal for receiving the MODE SWITCHING signal CS from the mode signal buffer 63 through the two inverters 84, 85, while each of the second AND gates 74–77 has a first input terminal for receiving the MODE SWITCHING signal CS from the mode signal buffer 63 through only the inverter 84. Each of the AND gates 70–77 has a second input terminal which receives an ENABLE signal ES of a low level (n) through the inverter 86.

The bus line D0 of the first data bus DB1 is connected to a third input terminal of the AND gates 70, 74, 75 while the bus line D1 is connected to a third input terminal of the AND gates 71, 76 and 77. Further, the bus line D2 is connected to a third input terminal of the AND gate 72 while the bus line D3 is connected to a third input terminal of the AND gate 73.

The data converter unit 64a further has four OR gates 80–83. The two AND gates 70, 74 have output terminals connected to respective two input terminals of the first OR gate 80. The two AND gates 71, 75 have output terminals connected to respective two input terminals of the second OR gate 81. The two AND gates 72, 76 have output terminals connected to respective two input terminals of the third OR gate 82. The two AND gates 73, 77 have output terminals connected to respective input terminals of the fourth OR gate 83. The four OR gates 80–83 have respective output terminals which are connected to the respective bus lines d0, d1, d2, d3 of the second data bus DB2.

There will next be described an operation of the data converter unit 64a.

When the MODE SWITCHING signal CS received from the mode signal buffer 63 has a high level (H), the levels of the signals at the first input terminals of the second AND gates 74–77 are low (L), while those of the first AND gates 70–73 are high (H). In this condition, signals received from the bus lines D0–D3 connected to the third input terminals of the first AND gates 70–73 are fed to the bus lines d0–d3 through the respective OR gates 80–83, since the levels of the second input terminals of the all AND gates 70–77 are high (H). The other three data converter units 64b–64d are operated in the same way. Accordingly, the data bus switching circuit 64 is placed in the 1X mode when the level of the MODE SWITCHING signal CS is high (H), that is, when a batch of original image data received from the external device 90 has the FINE image resolution.

When the level of the MODE SWITCHING signal CS is low (L), the levels of the signals at the first input terminal of the second AND gates 74–77 are high (H), while those of the first AND gates 70–73 are low (L). In this condition, signals received from the bus lines D0 and D1 connected to the third input terminals of the AND gates 74–77 are fed to the bus lines d0–d3 through the respective OR gates 80–83. Described more specifically, the signal from the bus line D0 is fed to the two bus lines d0 and d1, while the signal from the bus line D1 is fed to the two bus lines d2 and d3. Accordingly, the data bus switching circuit 64 is placed in the 2X mode when the level of the MODE SWITCHING signal CS is low (L), namely, when a batch of original image data has the STANDARD image resolution.

The level of the MODE SWITCHING signal CS generated by the mode signal buffer 63 is determined by the level of a MODE SELECT signal MS received from the external device 90 or the keyboard 91 through the register 68 indicated above. When the level of the MODE SELECT signal MS is high (H) to select the 1X mode, the MODE SWITCHING signal CS of the high level (H) is fed from the mode signal buffer 63 to the data bus switching circuit 64 and to the WRITE control circuit 65. When the level of the MODE SELECT signal MS is low (L) to select the 2X mode, the MODE SWITCHING signal CS of the low level (L) is fed to the switching circuit 64 and WRITE control circuit 65.

Figure 6:
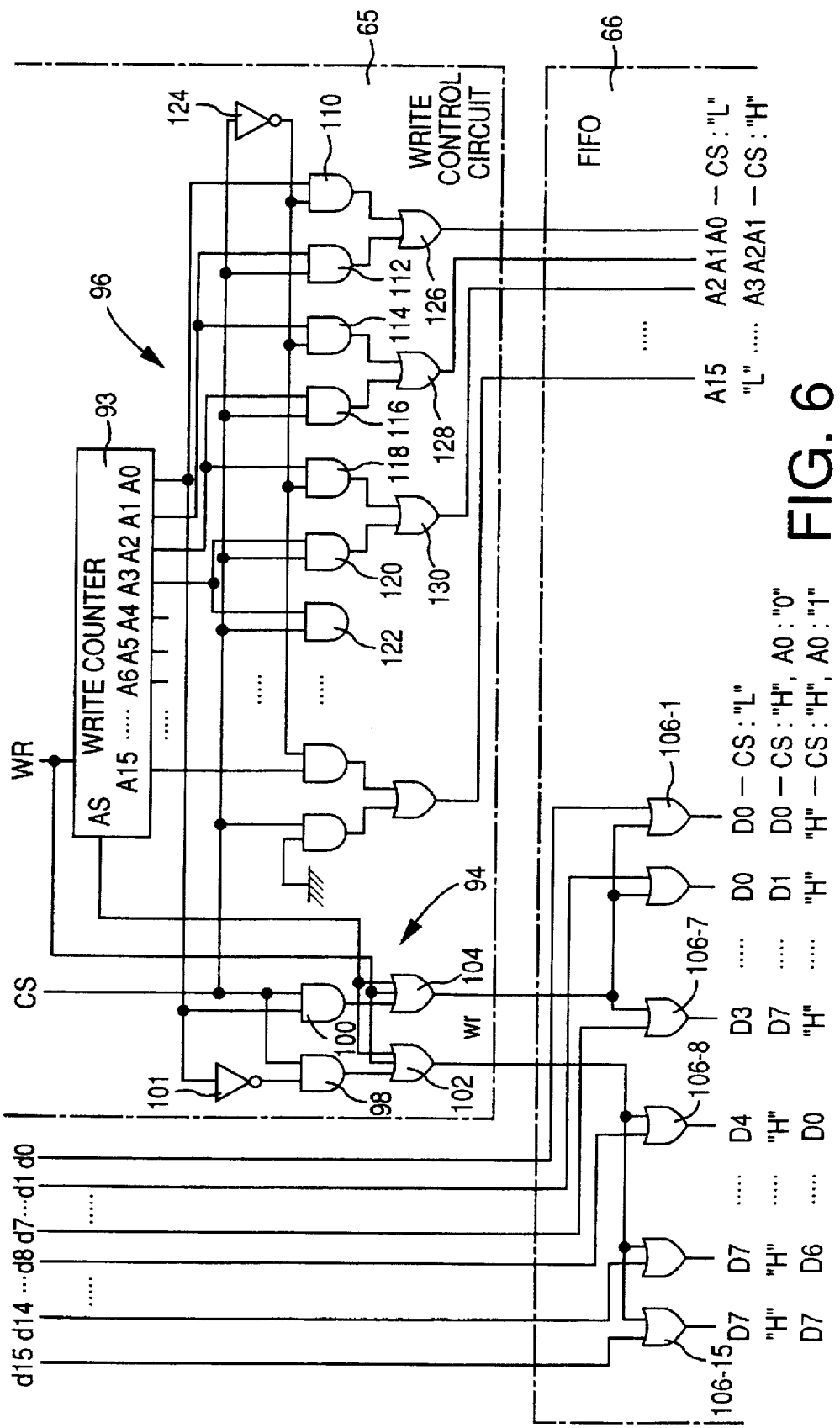
FIG. 6 is a circuit diagram showing an arrangement of a WRITE control circuit incorporated in the image data converter.

Referring to FIG. 6, there will be described the WRITE control circuit 65. This circuit 65 includes a WRITE COMMAND counter 93, a WRITE signal generator circuit 94 connected to the WRITE COMMAND counter 93, and an address bus switching circuit 96 also connected to the WRITE COMMAND counter 93. The counter 93 is adapted to count the number of WRITE commands received from the DMA controller 61, namely, the number of byes of the original dot data which have been fed from the DOT DATA memory 53a of the RAM 53 to the data bus switching circuit 64 through the first data bus DB1.

The WRITE COMMAND counter 93 generates digit signals A0, A1, A2, A3, etc., which represent the count indicative of the number of the WRITE commands WR. The least significant digit signal A0 (LSD signal A0) is applied to two AND gates 98, 100 of the WRITE signal generator circuit 94, which is adapted to generate WRITE signals wr to be applied to the FIFO memory 66. The AND gate 98 receives the LSD signal A0 through an inverter 101, while the AND gate 100 receives directly the LSD signal A0. The AND gates 100 also receive the MODE SWITCHING signal CS from the mode signal buffer 63.

Outputs of the AND gates 98, 100 are applied to OR gates 102, 104, respectively. The OR gates 102, 104 also receives the WRITE command WR from the DMA controller 61 and a STROBE signal AS from the WRITE COMMAND counter 93. The STROBE signal AS is delayed with respect to the WRITE command WR such that a period during which the level of the STROBE signal AS is low partially overlaps a period during which the level of the WRITE command WR is low. An output of the OR gate 102 is received by OR gates 106–8 through 106–15 of the FIFO memory 66 which are connected to the bus lines dB–d15 of the second data bus DB2. On the other hand, an output of the OR gate 104 is received by OR gates 106–0 through 106–7 of the FIFO memory 66 which are connected to the bus lines d0–d7 of the second data bus DB2. These outputs of the OR gates 102, 104 serve as the WRITE signals As described below in detail, the signals received from the bus lines d0–d7 of the second data bus DB2 are written into the low-order byte area (eight bits as counted from the least significant digit) at a currently designated address of the FIFO memory 66 when the the level of the WRITE signal wr generated by the OR gate 104 is low (L). When the level of the WRITE signal wr generated by the OR gate 102 is low (L), the signals received from the bus lines d8–d15 are written into the high-order byte area (eight bits as counted from the most significant digit) at the currently designated address of the FIFO memory 66. When the levels of the WRITE signals wr generated by the two OR gates 102, 104 are both low (L), the signals received from the bus lines d0–d15 are written into the low-order and high-order byte areas at the currently designated areas of the FIFO memory 66.

The WRITE command WR and STROBE signal AS are normally held at the high level (H), and are turned to the low level (L) when the DMA controller 61 is commanded to effect the direct memory access control to transfer one byte of original dot data from the DOT DATA memory 53a to the data converting circuit 62. The LSD signal A0 generated by the WRITE COMMAND counter 93 is alternately changed between the low and high levels each time the WRITE command WR is received from the DMA controller 61. The MODE SWITCHING signal CS is held at the high level (H) when the 1X mode is selected by the MODE SELECT signal MS, and is held at the low level (L) when the 2X mode is selected by the MODE SELECT signal MS. In the WRITE signal generator circuit 94, therefore, the levels of the WRITE signals wr generated by the OR gates 102, 104 are alternately made low (L) to alternately select the high-order and low-order byte areas at the currently selected address of the FIFO memory 66, each time the WRITE command WR is received from the DMA controller 61 while the level of the MODE SWITCHING signal CS is held high (H), namely, while the 1X mode is selected. While the 2X mode is selected with the signal CS being held at the low level (L), the WRITE signals wr generated by the two OR gates 102, 104 are made low (L) upon generation of each WRITE command WR from the DMA controller 61.

It is noted that the signal lines for the WRITE signal wr shown in FIG. 6 are represented by a single signal line wr in FIG. 3.

The address of the FIFO memory 66 at which the signals from the bus lines of the second data bus DB2 are written is designated by a WRITE ADDRESS signal AD generated by the address bus switching circuit 96, as described below.

The address bus switching circuit 96 is provided between the WRITE COMMAND counter 93 and an address bus connected to the FIFO memory 66. The circuit 96 includes AND gates 110, 112, 114, 116, 120, 122, etc. The digit signal A0 of the WRITE COMMAND counter 93 is applied to the AND gate 110, and the digit signal A1 is applied to the AND gates 112 and 114. The digit signal A2 is applied to the AND gates 116 and 118 while the digit signal A3 is applied to the AND gates 120 and 122. The other digit signals A4–A15 are similarly applied to the appropriate AND gates. The MODE SWITCHING signal CS is directly applied to the AND gates 112, 116 and 120, and is applied to the AND gates 110, 114, 118 and 122 through an inverter 124. Outputs of the AND gates 110, 112 are received by an OR gate 126, while outputs of the AND gates 114, 116 are received by an OR gate 128. Output of the AND gates 118, 120 are received by an OR gate 130.

When the MODE SWITCHING signal CS is held at the high level (H) for selecting the 1X mode, the levels of the output signals of the OR gates 126, 128, 130, etc. are the same as the levels of the digit signals A1, A2, A3, etc., respectively, so that the address number represented by the output signals of the address bus switching circuit 96 is one half of the count value of the WRITE COMMAND counter 93. When the MODE SWITCHING signal CS is held at the low level (L) for selecting the 2X mode, the levels of the output signals of the OR gates 126, 128, 130, etc. are the same as the levels of the digit signals A0, A1, A2, etc., respectively, so that the address number represented by the output signals of the circuit 96 is equal to the count value of the WRITE COMMAND counter 93. According to this arrangement of the address bus switching circuit 96, the address of the FIFO memory 66 designated by the circuit 96 in the 1X mode is incremented upon completion of alternate writings of two bytes of print dot data into respective low-order and high-order byte areas of the FIFO memory 66 as a result of reception by the WRITE COMMAND counter 93 of two WRITE commands WR from the DMA controller 61. When the 2X mode is selected, the designated address of the FIFO memory 66 is incremented each time two bytes of print dot data have been simultaneously written into the low-order and high-order byte areas of the FIFO memory 66 as a result of reception of each WRITE command WR.

It is noted that the address signal lines connected to the OR gates 126, 128, 130, etc. shown in FIG. 6 are represented by a single signal line AD in FIG. 3.

It will be understood from the above explanation that each address number of the FIFO memory 66 designated by the WRITE ADDRESS signal AD generated by the address bus switching circuit 96 corresponds to each 16-bits or two-bytes region, and that the low-order or high-order areas at each address or these two areas is/are designated by the WRITE signals wr generated by the WRITE signal generator circuit 94, so that the two bytes of print dot data are alternately written at different times or simultaneously written in the two-bytes region at each address designated by the WRITE ADDRESS signal.

Referring next to the schematic flow chart of FIG. 7, there will be described the data conversion and printing control routine executed by the video controller 50 according to a program stored in the ROM 52.

The routine of FIG. 7 is started when a batch of original dot data representative of one page of image has been generated by conversion of image data (e.g., coded image data or compressed image data) as received from the external device 90 and stored in the DOT DATA memory 53a of the RAM 53.

That is, the routine is initiated with step S10 in which the CPU 51 commands the DMA controller 61 to access the DOT DATA memory 53a, and supplies the DMA controller 61 with control information including address information which designates the addresses of the memory 53a from which one set of the original dot data for one line is transferred to the data converting circuit 62.

Then, the control flow goes to step S11 wherein the CPU 51 commands the DMA controller 61 to prepare for direct transfer of a set of original dot data from the DOT DATA memory 53a on the basis of the control information supplied. Step S11 is followed by step S12 to command the DMA controller 61 to start the direct transfer of the original dot data set to the data converting circuit 62. The original dot data set consists of a predetermined number of bytes stored at the addresses of the DOT DATA memory 53a which are designated by the address information received from the CPU 51. These bytes of the original dot data set are sequentially transferred to the circuit 62 one after another, under the control of the DMA controller 61, without the control by the CPU 51. For transferring each byte of the original dot data set, the appropriate address of the DOT DATA memory 53a is connected to the first data bus DB1, and the WRITE signal wr is fed to the circuit 62, more specifically, to the WRITE COMMAND counter 93 and the WRITE SIGNAL generator circuit 94. As a result, the corresponding print dot data set is temporarily stored in the FIFO memory 66 and is sent as the video signal VD to the printing mechanism PM through the DC control circuit 58, for printing along one line (in the 1X mode) or two lines (in the 2X mode) according to the print dot data set.

While step S12 is implemented, the CPU 51 operates to perform operations (S13) other than the operation to control the DMA controller 61. If the CPU receives an interruption signal from the DMA controller 61, the operation in step S13 is interrupted, and the control flow goes to step S14. This interruption signal is generated by the DMA controller 61 when the DMA controller 61 receives the READ signal YS from the READ SIGNAL OUTPUT counter In step S14, the CPU 51 determines whether a printing according to the print dot data obtained from the entire batch of original dot data stored in the DOT DATA memory 53a has been completed. Namely, step S14 is implemented determine whether one page of image has been printed. If an affirmative decision (YES) is obtained in step S14, the routine of FIG. 6 is terminated, and the control flow goes to a main routine. If a negative decision (NO) is obtained in step S14, the control flow returns to step S10. Thus, the printing mechanism PM is operated to repeat printing operations according to individual sets of the original dot data corresponding to different lines stored in the DOT DATA memory 53a, which are sequentially read out under the control of the DMA controller 61 and converted into respective sets of print dot data representative of one page of image to be reproduced.

In the case where an original image represented by the original dot data stored in the DOT DATA memory 53a has the FINE image resolution of 600 dpi, the MODE SELECT signal MS received by the mode signal buffer 63 has the high level (H), and the MODE SWITCHING signal CS of the high level is applied to the data bus switching circuit 64, whereby the circuit 64 is placed in the 1X mode. In this 1X mode, each one byte of the original dot data in the DOT DATA memory 53a is transferred to the second data bus DB2 through the first data bus DB1 and the data bus switching circuit 64, as the corresponding one byte of the print dot data. In this case, the logical values of the eight bits of the print dot data are the same as those of the original dot data.

In this 1X mode, the count of the WRITE COMMAND counter 93 of the WRITE control circuit 65 is incremented each time the WRITE command WR is received from the DMA controller 61, that is, each time one byte of the original dot data is read out from the DOT DATA memory 53a. As a result, the WRITE signals wr generated by the OR gates 102, 104 of the WRITE SIGNAL generator circuit 94 are alternately made low (L) each time the LSD signal AO received by the circuit 94 is alternately changed between the high and low levels. Further, the address number represented by the WRITE ADDRESS signal AD generated by the address bus switching circuit 96 is incremented each time the count of the WRITE COMMAND counter 93 is incremented two times, that is, each time two bytes of the original dot data have been read out from the DOT DATA memory 53a. Thus, the successive bytes of the print dot data are alternately stored in the low-order and high-order byte areas at the address number of the FIFO memory 66 which is incremented by the WRITE ADDRESS signal AD, as indicated in FIG. 8 wherein the first and second bytes of print dot data are stored at one address number of the FIFO memory 66 while the third byte of print dot data is stored at another address number. The dot data bits of the successive bytes of the print dot data for one line of image stored in the FIFO memory 66 are transferred serially or sequentially one after another to the printing mechanism PM, as VIDEO signals VD for modulating the laser beam LB for. imagewise scanning of the photosensitive drum 21 in the primary scanning direction (S12). An image dot is formed on the recording medium when the corresponding dot data bit is "0" or the corresponding signal in the FIFO memory 66 has the low level (L).

The READ SIGNAL OUTPUT counter 67 is adapted to decrement or count down a VDCLK counter, each time the VIDEO CLOCK signal VDCLK is generated from the TC generator 54 upon transferring of each VIDEO signal VD (print dot data bit) from the FIFO memory 66 to the DC control circuit 58. when the data bus switching circuit 64 is placed in the 1X mode, an initial count of this VDCLK counter is set at a first value corresponding to the number of the picture elements along one line printed with the FINE image resolution. When the circuit 64 is placed in the 2X mode, the initial count of the VDCLK counter is set at a second value which is twice the first value, that is, corresponds to the number of the picture elements along two lines printed with the FINE image resolution. When the horizontal synchronizing signal BD is received from the printing mechanism PM after the count of the VDCLK counter is zeroed, the READ signal YS is fed from the READ SIGNAL OUTPUT circuit 67 to the DMA controller 61 through the signal line 59, and the interruption signal is fed from the the DMA controller 61 to the CPU 51, whereby the control flow goes from step S13 to step S14 of FIG. 7. The horizontal synchronizing signal BD serves as a one-line signal indicating that one line of image has been printed according to the appropriate set of print dot data.

In the 1X mode, therefore, the control flow returns to step S10 one implement steps S10–S14 after each one line of image has been printed based on a set of print dot data stored in the FIFO memory 66. Thus, the print dot data set for one line of image is written in the FIFO memory 66 as the corresponding original dot data set is read out from the DOT DATA memory 53a under the control of the DMA controller 61. When steps S10–S12 have been implemented for the entire batch of the original dot data stored in the DOT DATA memory 53a, that is, when the affirmative decision (YES) is obtained in step S14, the data conversion and print control routine of FIG. 7 is terminated, and the control flow goes to a main routine.

In the case where an original image represented by the original dot data stored in the DOT DATA memory 53a has the STANDARD image resolution of 300 dpi, the MODE SELECT signal MS received by the mode signal buffer 63 has the low level (L), and the MODE SWITCHING signal CS of the low level (L) is applied to the data bus switching circuit 64, whereby the circuit 64 is placed in the 2X mode.

In this 2X mode, each one byte of the original dot data in the DOT DATA memory 53a is converted by the data bus switching circuit 64 into the corresponding two bytes of the print dot data, which are stored in both the low-order and high-order areas at the currently designated address number of the FIFO memory 66, as indicated in FIG. 9. The address number of these areas of the FIFO memory 66 is designated by the WRITE ADDRESS signal AD generated by the address bus switching circuit 96. In the 2X mode, the bit of the original dot data corresponding to the bus line D0 of the first data bus DB1 is converted into two adjacent bits of the print dot data in the memory 66, which have the same logical value. These two bits are indicated at D0, D0 in FIG. 9. Similarly, the bit of the original dot data corresponding to the bus line D1 of the first data bus DB1 is converted into two adjacent two bits of the print dot data, which have the same logical value. These two bits are indicated at D1, D1 in FIG. 9. This conversion rule in the 2X mode is applied to all the bits of the original dot data corresponding to all the other bus lines D2–D7 of the first data bus DB1. Thus, each bit of the original dot data in the DOT DATA memory 53a is converted into the two adjacent bits of the print dot data having the same logical value, whereby the original dot data of the STANDARD image resolution of 300 dpi are converted into the print dot data of the FINE image resolution of 600 dpi.

In the 2X mode in which the level of the MODE SWITCHING signal CS is low (L), the levels of the WRITE signal wr generated by the two OR gates 102, 104 of the WRITE signal generator circuit 94 are both low (L), the 16 bits of the print dot data are simultaneously written at the appropriate address of the FIFO memory 66, which is incremented by the WRITE ADDRESS signal AD each time WRITE command is generated, that is, each time one byte of the original dot data is read out from the DOT DATA memory 53a. The print dot data bits thus stored in the FIFO memory 66 are serially transferred to the printing mechanism PM, the VIDEO signals VD, for imagewise scanning the photosensitive drum 21 along a line in the primary scanning direction, and the printing is effected on the recording medium along a line according to the VIDEO signals successively received from the FIFO memory 66.

In the 2X mode, the initial count of the VDCLK counter which is to be decremented in the READ SIGNAL OUTPUT counter 67 upon generation of each VIDEO CLOCK signal VDCLK is twice that in the 1X mode, as already explained above. Accordingly, the count of the VDCLK counter is one half of the predetermined initial count when the first horizontal synchronizing signal BD is generated after the decrementing of the counter is started. When the second horizontal synchronizing signal BD is received from the printing mechanism PM after the count of the VDCLK counter is zeroed, the READ signal YS is fed to the DMA controller 61 through the signal line 59. Thus, the READ signal YS is generated each time two horizontal synchronizing signals BD have been received by the video controller 50, in other words, each time the printing is effected by the printing mechanism PM, along two successive lines both according the same print dot data set stored in the FIFO memory 66. Namely, the print dot data set in the FIFO memory 66 is used twice for printing the two successive identical lines of image.

As in the 1X mode, the generation of the READ signal YS causes the DMA controller 61 to generate the interruption signal, which causes the control flow of the CPU 51 from step S13 to seep S14, whereby steps S10–S14 are repeated if the printing job has not been completed, namely, if the printing according to the print dot data obtained from the entire batch of the original dot data in the DOT DATA memory 53a has not been completed.

It will be understood from the foregoing description that when the original dot data stored in the DOT DATA memory 53a has the FINE image resolution and the data bus switching circuit 64 is placed in the 1X mode selected by the MODE SWITCHING signal MS, a set of the original dot data for one line is read out one byte after another from the DOT DATA memory 53a, stored as the print dot data set in the FIFO memory 66 through the data converting circuit 64, and transferred as the VIDEO signals VD from the FIFO memory 66 to the printing mechanism PM, for printing along a line each time the horizontal synchronizing signal BD is generated.

When the original dot data has the STANDARD image resolution and the circuit 64 is placed in the 2X mode, one set of the original dot data is converted by the data converting circuit 64 into the corresponding set of print dot data of the FINE image resolution stored in the FIFO memory 66, which are transferred as the VIDEO signals VD to the printing mechanism PM, for printing along two lines each time two horizontal synchronizing signals BD have been generated. As in the 1X mode, the conversion of the original dot data of the STANDARD image resolution into the print dot data of the FINE image resolution by the data converting circuit 62 is effected as the original dot data are read out from the DOT DATA memory 53a under the control of the DMA controller 61, no extra time is required to generate the print dot data of the FINE image resolution before the print dot data are transferred from a shift register to the printing mechanism as in the prior art apparatus. Further, the present apparatus does not require a large-capacity memory such as a page memory for storing a batch of print dot data for a page of image. In the present embodiment of the invention, the same set of print dot data corresponding to one set of the original dot data for one line is used for printing two successive identical lines of image in the 2X mode, upon generation of every second horizontal synchronizing signal BD. This is contrary to the prior arrangement which require two identical sets of print dot data which are used upon generation of the respective horizontal synchronizing signal BD for printing two successive identical lines of image. The present arrangement therefore reduces the thus required for transferring the print dot data as the VIDEO signals to the printing mechanism. Further, the present arrangement requires only one kind of clock signal for reading out the original dot data from the DOT DATA memory 53a and only one kind of clock signal for transferring the print dot data from the FIFO memory 66 to the DC control circuit 58, and does not require switching between two different clock signals for each of the 1X and 2X modes, whereby the control system can simplified and is available at a reduced cost.

While the present invention has been described in detail in its presently preferred embodiment by reference to the accompanying drawings, it is to be understood that the invention is not limited to the details of the illustrated embodiment, but may be embodied with various changes, modifications and improvements, which may occur to those skilled in the art, in the light of the foregoing teachings.

For instance, the data bus switching circuit 64 may be modified such that the AND gates 70-77 and the OR gates 80-83 are all replaced by respective NAND gates. Other modifications of the data bus switching circuit 64 are possible, provided that the modified circuit performs substantially the same function as disclosed herein.

In the illustrated embodiment, the WRITE control circuit 65 is provided to sequentially designate the address numbers of the FIFO memory 66 and the high-order and low-order areas of the currently designated address number, the FIFO memory 66 per se may be modified to perform these functions. For instance, the FIFO memory 66 may be adapted to receive the WRITE command WR from the DMA controller 61 and the MODE SWITCHING signal CS from the mode signal buffer 63, and operate on the basis of these signals WR, CS, to designate the address number thereof, and alternately designate the high-order or low-order area of the currently designated address number when the 1X mode is selected, and the high-order and low-order areas of the currently designated address number when the 2X mode is selected.

Further, the FIFO memory 66 may be modified to have at least one of the functions performed by the WRITE signal generator circuit 94 and the address bus switching circuit 96 of the WRITE control circuit.

While the illustrated embodiment described above uses the DMA controller 61 to read the original dot data from the DOT DATA memory 53a and write the print dot data into the FIFO memory 66, the CPU 51 may be used for these purposes. Further, the data converting circuit 62 may be modified to operate selectively in the 1X mode and a 3X, 4X or NX mode in which one bit of original dot data is converted into three or four bits or N number of bits of print dot data. Although the FIFO memory 66 is used as the shift register in the illustrated embodiment, a FILO memory (first-in last-out memory) or a LIFO memory (last-in first-out memory) may be used as the shift register.

While the laser printer 1 has been described as incorporating the image data converting apparatus constructed according to the present invention, the principle of the present invention is equally applicable to other types of recording or printing apparatus which have an input data buffer for storing original image data received from an external device, an intermediate data buffer, and a printing mechanism adapted to effect printing along each line by imagewise scanning according to a set of print data in the primary scanning direction.

What is claimed is:

1. An image data processing apparatus having an original image data memory for storing a batch of original image data, and a shift register for storing print image data obtained by conversion from the original image data which are received from the original image data memory at least one byte at a time, said print image data being serially fed from the shift register to printing means for printing according to said print data, said apparatus comprising:

a data bus switching circuit selectively operable in a 1X mode and an NX mode for selectively placing a data bus connecting said original image data memory to said shift register, in a 1X state and an NX state, respectively, wherein said data bus, when placed in said 1X state, transfers as a bit of said print image data each bit of said original image data to said shift register without conversion thereof, and said data bus, when placed in said NX state, converts said each bit of said original image data into a plurality of bits of said print image data which have the same logical value equal to a logical value of said each bit of said original image data and which are stored in said shift register, a number of said plurality of bits of said print image data being equal to "N" which is a natural number not smaller than "2";

mode selector means for placing said data bus switching circuit in one of said 1X and NX modes in response to a mode select signal which is received from an external device and which selects one of said 1X and NX modes;

address counting means for designating addresses of said shift register at which the print image data are sequentially stored in response to said mode select signal, and each write command for reading out from said original image data memory said at least one byte of said original image data and storing a corresponding print image data in said shift register through said data bus when a set of said original image data representative of one line of image is converted into a corresponding set of print image data; and read signal generating means for generating a read signal for reading out from said original image data memory said set of said original image data, on the basis of said mode select signal and a one-line signal received from said printing means in relation to printing of each one line of image.

2. An image data processing apparatus according to claim 1, wherein said address counting means increments a count of a number of the addresses of said shift register each time N bytes of said original image data have been transferred to said shift register when said data bus switching circuit is placed in said 1X mode, and increments said count each time one byte when said original image data has been converted into said print image data when said data bus switching circuit is placed in said NX mode.

3. An image data processing apparatus according to claim 1, wherein said read signal generating means generates said read signal each time that said read signal generating means has received once said one-line signal when said 1X mode is selected by said mode select signal, and generates said read signal each time that said read signal generating means has received N times said one-line signal when said mode select signal selects said NX mode.

4. An image data processing apparatus according to claim 1, wherein said one-line signal includes a horizontal synchronizing signal which is generated before another set of said original image data is read out from said original image data memory and which activates said printing means to start a printing operation on a recording medium according to the print image data corresponding to said another set of said original image data.

5. An image data processing apparatus according to claim 4, wherein said shift register transfers bits of said print image data serially one after another to said printing means in response to video clock signals.

6. An image data processing apparatus according to claim 5, wherein said read signal generating means comprises a video clock counter for counting the number of said video clock signals and generating a count-up signal when a count of said video clock counter becomes equal to a first value equal to the number of bits of print image data representative of one line of image while said 1X mode is selected by said mode select signal, and when said count of said video clock counter becomes equal to a second value equal to the number of bits of the print image data representative of N lines of image while said NX mode is selected by said mode select signal, said read signal generating means generating said read signal when said horizontal synchronizing signal is received after said count-up signal is generated.

7. An image data processing apparatus according to claim 1, further comprising a direct memory access controller for reading said at least one byte of said original image data from said original image data memory in response to said read signal generated by said read signal generating means.

8. An image data processing apparatus according to claim 7, wherein said address counting means comprises a write command counter for counting a number of write commands received from said direct memory access controller, and generating a write address signal and write information on a basis of a count of the number of write commands and said mode select signal, said write information designating an area of said shift register at the address designated by an address signal, for storing in said area the print image data corresponding to said at least one byte of said original image data.

9. An image data processing apparatus according to claim 7, further comprising a processing unit for controlling said direct memory access controller, and wherein said direct memory access controller applies an interruption signal to said processing unit when said read signal generated by said read signal generating means is applied to said direct memory access controller, said processing unit supplying said direct memory access controller with control information for starting an operation to read out another set of the original image data from said original image data memory, upon reception of said interruption signal, said control information including data indicative of a location from which another set of the original image data is read out from said original image data memory.

10. An image data processing apparatus according to claim 1, wherein said at least one byte of said original image data which is read out from said original image data memory consists of one byte, and said NX mode is a 2X mode in which "N" is equal to "2".

11. An image data processing apparatus according to claim 1, wherein said mode selector means comprises a mode signal memory for storing said mode select signal received from said external device, and places said data bus switching circuit in one of said 1X and NX modes depending upon said mode select signal stored in said mode signal memory.

12. A printer incorporating an image data processing apparatus according to claim 1, and said printing means which operates to effect a printing operation on a recording medium according to said print image data obtained by said image data processing apparatus.

13. A printer according to claim 12, wherein said printing means comprises:

a latent image forming device including a photosensitive drum and a scanning device for imagewise scanning a photosensitive surface of said photosensitive drum with a laser beam modulated according to said print image data, in a primary scanning direction parallel to an axial direction of said drum and in a secondary scanning direction parallel to a rotating direction of said photosensitive drum, for thereby forming a latent image represented by said print image data; and a visible image forming device for developing said latent image into a visible image on said recording medium.

14. An image data processing apparatus for converting original image data, at least one byte at a time, into print image data which are serially fed to printing means, comprising:

a first data bus having a plurality of first signal lines for transferring at one time bits of at least one byte of said original image, a number of said plurality of signal lines being equal to "M" which is a natural number;

a second data bus having a plurality of second signal lines for transferring at one time bits of said print image data obtained from said at least one byte of said original image data, a number of said bits of said print image data which are transferred at one time being equal to (N×M), where "N" is a natural number not smaller than "2", the number of said plurality of second signal lines being equal to (M×N);

a data bus switching circuit provided between said first and second data buses, and selectively operable in a 1X mode and an NX mode in response to a mode select signal received from an external device, said data bus switching circuit placed in said 1X mode transferring, as bits of 1X print image data, bits of said original image data from said first signal lines to selected ones of said second signal lines without conversion thereof, a number of said selected ones of said second signal lines being equal to "M", said data bus switching circuit placed in said NX mode transferring said bits of said original image data from said first signal lines to said second signal lines a number of which is equal to (M×N) such that each of said bits of said original image data received through the corresponding one of said first signal lines is converted into a plurality of bits of NX print image data which have the same logical value equal to a logical value of said each bit of said original image data, the number of said plurality of bits of NX print image data being equal to "N";

reading means for transferring a set of said original image data representative of one line of image, at least one byte at one time, from an original image data memory to said data bus switching circuit through said first data bus;

print image data memory means connected to said second data bus, for sequentially storing successive units of said 1X print image data each consisting of at least one byte received from said second signal lines a number of which is equal to "M", when said data bus switching circuit is placed in said 1X mode, and for sequentially storing successive units of said NX print image data each consisting of said at least one byte multiplied by "N" received from said second signal lines a number of which is equal to (M×N), when said data bus switching circuit is placed in said NX mode; and read signal generating means for generating a read signal for reading out from said original image data memory said set of original image data, on the basis of said mode select signal and a one-line signal received from said printing means in relation to printing of each one line of image.

15. An image data processing apparatus according to claim 14, wherein said data bus switching circuit comprises:

an array of AND gates each having a first and a second input terminal, and an output terminal whose level is made high when levels at said first and second input terminals are both high, said array of AND gates consisting of a first group of AND gates and a second group of AND gates which are arranged such that the AND gates of said first and second group are arranged alternately in a predetermined first order, said first signal lines of said first data bus being connected to said first input terminals of the AND gates of said first group, respectively, each of said first signal lines being connected to said first input terminals of adjacent AND gates of said second group, the number of said adjacent AND gates being equal to "N";

an array of OR gates each having a first and a second input terminal, and an output terminal, said OR gates being arranged in a predetermined second order such that said first and second input terminals of said each OR gate are respectively connected to said output terminals of one of said AND gates of said first group and one of said AND gates of said second group which is adjacent to said one of said AND gates of said first group in said predetermined first order, each of said OR gates having an output terminal whose level is made high when at least one of levels of said first and second input terminals of said each OR gate is high, said second signal lines of said second data bus being connected to said output terminals of said OR gates, respectively; and a first and a second switching signal line which are connected to said second input terminals of said AND gates of said first and second groups, respectively, said mode signal being applied through said first switching signal line to said second input terminals of said AND gates of said first group, while a signal whose level is inverted with respect to said mode select signal being applied through said second switching signal line to said second input terminals of said AND gates of said second group.

16. An image data processing apparatus according to claim 15, wherein each of said AND gates has a third input terminal which receives an input signal which has a high level while said data bus switching circuit is in operation.

17. An image data processing apparatus according to claim 14, wherein said data bus switching circuit comprises a mode signal memory for storing mode data which determine a level of said mode select signal, said mode select signal being applied to said second input terminals of each of said first group of AND gates while a signal whose level is inverted with respect to said mode select signal being applied to said second group of AND gates.

18. An image data processing apparatus according to claim 14, wherein said reading means comprises a direct memory access controller.

19. An image data processing apparatus according to claim 180 wherein said print image data memory comprises:

a print image data memory for storing said print image data and serially transferring bits of said print image data one after another in the order, in response to video clock signals; and write signal generating means for counting write commands each of which is generated from said direct memory access controller when said at least one byte of said original image data is read out from said original image data memory, said write signal generating means designating a location of said print image data memory at which said print image data are stored, on the basis of a count of said write commands and said mode select signal.

20. An image data processing apparatus according to claim 19, wherein said print image data memory consists of a first-in first-out memory from which bits of said print image data are serially transferred to said printing means one after another in the order in which said bits of said printing image data are stored.

21. An image data processing apparatus according to claim 19, wherein said read signal generating means comprises:

a video clock counter for counting the number of said video clock signals and generating a count-up signal when a count of said video clock counter becomes equal to a first value equal to the number of bits of the print image data representative of one line of image while said 1X mode is selected by said mode select signal, and when said count of said video clock counter becomes equal to a second value equal to the number of bits of the print image data representative of N lines of image while said NX mode is selected by said mode select signal; and a signal generating circuit for generating said read signal on the basis of said count-up signal and a horizontal synchronizing signal which is generated before said set of said original image data is read out from said original image data memory and which activates said printing means to start a printing operation on a recording medium according to said print image data corresponding to said set of said original image data.

* * * * *